United States Patent [19]
Jannard

[11] Patent Number: 5,541,674
[45] Date of Patent: Jul. 30, 1996

[54] DIMENSIONALLY STABLE EYEWEAR

[75] Inventor: James H. Jannard, Eastsound, Wash.

[73] Assignee: Oakley, Inc., Irvine, Calif.

[21] Appl. No.: 416,211

[22] Filed: Apr. 4, 1995

[51] Int. Cl.$^6$ .................................................. G02C 1/06
[52] U.S. Cl. ............................................ 351/41; 351/44
[58] Field of Search ............................. 351/41, 44, 83, 351/86, 87, 89, 125, 129, 130, 131

[56] References Cited

U.S. PATENT DOCUMENTS

| | | | |
|---|---|---|---|
| 3,552,840 | 9/1968 | Braget | 351/86 |
| 4,204,750 | 5/1980 | Hilbert | 351/130 |
| 4,611,371 | 9/1986 | Fujino et al. | 164/34 |
| 4,976,529 | 12/1990 | Segoshi et al. | 351/41 |

FOREIGN PATENT DOCUMENTS

| | | | |
|---|---|---|---|
| 1126329 | 11/1956 | France | 351/86 |
| 092007293 | 4/1992 | WIPO | 351/41 |

*Primary Examiner*—William L. Sikes
*Assistant Examiner*—James A. Dudek
*Attorney, Agent, or Firm*—Knobbe Martens Olson & Bear

[57] ABSTRACT

Disclosed are dimensionally stable eyewear frames, for minimizing visual distortion due to relative movement of the left and right optical zones of the eyewear. In one embodiment, the eyeglass orbitals are investment cast from substantially pure titanium or a titanium based alloy. The bridge may be integrally cast with the lens orbitals, or the parts may be separately formed and assembled later.

7 Claims, 2 Drawing Sheets

DIMENSIONALLY STABLE EYEWEAR

The present invention relates to improvements in optical stability of prescription and non-prescription eyewear. More particularly, the present invention relates to investment cast eyewear orbitals with improved dimensional stability.

BACKGROUND OF THE INVENTION

A wide variety of improvements have been made in recent years in the eyewear field, particularly as it relates to eyewear for use in active sports. For example, the unitary cylindrical lens was popularized by the Blades® (Oakley, Inc.) eyewear which incorporated, among others, the technology of U.S. Pat. No. 4,859,048 to Jannard. Toroidal unitary lens geometry having a constant horizontal radius throughout was introduced through a variety of products in the M Frame® line of eyeglasses, also produced by Oakley, Inc. See, e.g., U.S. Pat. No. 4,867,550 to Jannard. Various other improvements in eyewear systems suited for use in active sports are exemplified in U.S. Pat. Nos. 4,674,851, 4,730,915, 4,824,233, 4,867,550, 5,054,903, 5,137,342, 5,208,614 and 5,249,001, all to Jannard, et al.

The foregoing designs as well as other active sports eyeglasses on the market generally utilize a unitary lens or dual lenses formed from a polymer such as polycarbonate, which is mounted in a polymeric frame. Alternatively, the prior art includes eyeglasses in which glass or polymeric lenses have been mounted in frames formed from thin metal sections such as metal wire.

One continuing objective in the field of high quality eyewear, particularly that intended for use in high speed action sports, is minimizing distortion introduced by the eyewear. Distortion may be introduced by any of a variety of influences, such as poor construction materials for the optical portion of the lens, and inferior polishing and/or molding techniques for the lens. In addition, optical distortion can result from the interaction of the lens with the frame, including flexing of the frame and lens, as well as movement of the plane lying on a tangent to the center point of one optical zone with respect to the plane lying on a tangent to the center point of the other optical zone.

The technology exists for satisfactorily minimizing distortion introduced by characteristics of the lens alone. However, the overall optical precision of active sports eyewear up to this point has been limited by the combination of the polymeric lens in a polymeric or flexible wire frame. Eyeglass systems thus formed are susceptible to bending and flexing due to a variety of environmental causes such as impact, storage induced and other external forces, forces resulting from the assembly process of the eyewear, and exposure to heat. Flexing of the lens or spatial deviation of one lens with respect to the other undesirably changes refractive properties of the eyeglasses, whether the lens is corrective (prescription) or non-corrective.

Thus, there remains a need for a dimensionally stable support structure for eyeglass lenses, suitable for use with corrective and non-corrective lenses in rugged, high durability eyewear. Preferably, the eyewear remains aerodynamically suited for active sports such as high speed bicycle racing, skiing and the like, and weighs no more than necessary to accomplish the foregoing objectives.

SUMMARY OF THE INVENTION

There has been provided in accordance with one aspect of the present invention an investment cast dimensionally stable eyeglass system for resisting flexing due to impact and other stresses of the type normally encountered during storage and participation in active sports. The eyeglass frames are of the type for supporting a first lens in a first plane and a second lens in a second plane, and minimizing movement of the first plane with respect to the second plane, thereby minimizing flexibility induced distortion. Although the surface of a curved lens does not technically lie on a plane, each lens will be characterized by a plane lying on a tangent to the midpoint of the lens.

The eyeglass frames comprise a first cast orbital for surrounding the first lens, and a second cast orbital for surrounding the second lens. A bridge is provided for connecting the first lens orbital and the second lens orbital. The combination of the first and second orbitals and the bridge exhibits sufficient rigidity to maintain the first plane in a predetermined relationship with respect to the second plane.

Preferably, no portion of the eyeglass orbital has a length to diameter ratio of higher than about 0.3, and more preferably the ratio is no higher than about 1.0.

In accordance with another aspect of the present invention, there is provided a method of spatially stabilizing a first lens with respect to a second lens in a pair of eyeglasses, thereby minimizing optical distortion of the type due to deviation of either of said lenses from a predetermined spatial relationship. The method comprises the steps of providing first and second lenses, and providing a substantially inflexible eyeglass frame of the type having first and second dimensionally stable orbitals for receiving the first and second lenses.

Each of the first and second orbitals is provided with a lens seat formed therein for receiving the first and second lenses respectively. In one embodiment, each is further provided with an aperture dimensioned to permit a lens to be advanced into the respective lens seat.

A first and a second lens is advanced through the first and second aperture and into the first and second lens seats. Thereafter, the lenses are retained in their respective lens seats, thereby substantially maintaining a predetermined spacial relationship between the first and second lenses.

Preferably, the step of providing a substantially inflexible eyeglass frame comprises investment casting the frame from a substantially dimensionally stable material. Most preferably, the material comprises titanium.

Further features and advantages of the present invention will become apparent from the detailed description of preferred embodiments that follows, when considered together with the attached drawings and claims.

DETAILED DESCRIPTION OF THE PREFERRED EMBODIMENTS

Figure 1:
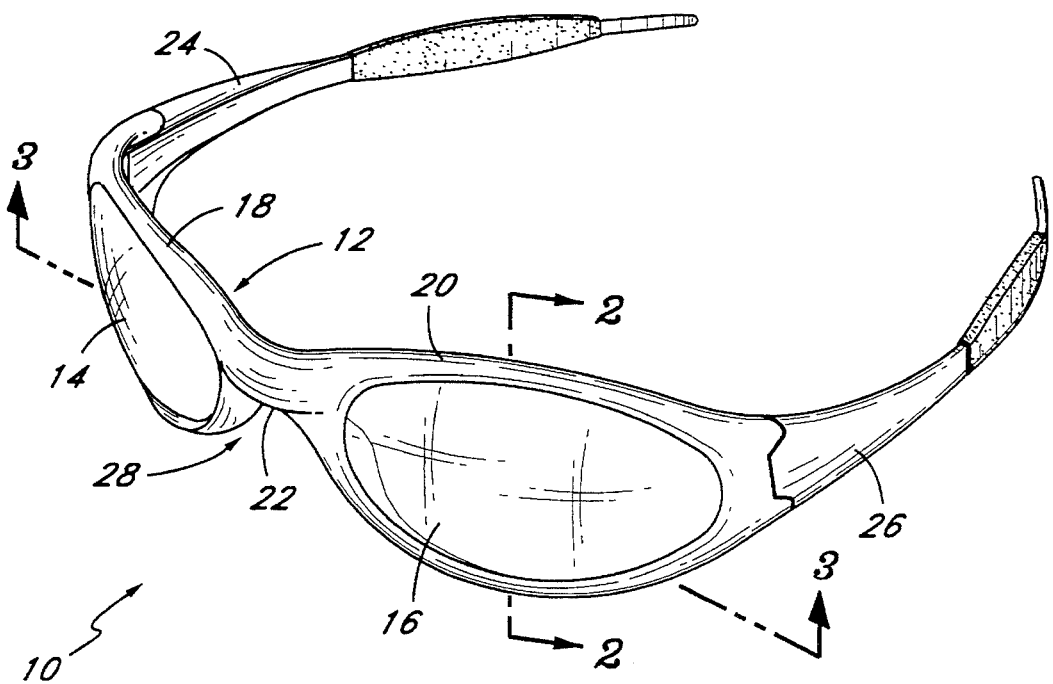
FIG. 1 is a perspective view of an eyeglass having a frame prepared in accordance with the present invention.

Referring to FIG. 1, there is disclosed one embodiment of an eyeglass prepared in accordance with the present invention. The eyeglass 10 generally comprises a frame 12 which, in the illustrated embodiment, supports a pair of lenses 14 and 16. Although the present invention will be described with reference to a dual lens system, it is to be understood that the methods and principles discussed herein are readily applicable to the production of frames for unitary lens eyeglass systems and protective goggle systems as well.

The frame 12 generally comprises a first orbital 18 and a second orbital 20 for supporting the first lens 14 and second lens 16. Although the present invention will be disclosed in the context of a pair of orbitals 18 and 20 which surround the respective lenses, the principles of the present invention also apply to eyeglass systems in which the frame only partially surrounds the lens or lenses, or contacts only one edge or a portion of one edge of the lens or each lens as well.

In the illustrated embodiment, the orbitals 18 and 20 are connected by a bridge portion 22.

The eyeglass 10 is also provided with a pair of generally rearwardly extending earstems 24 and 26 for retaining the eyeglass on the head of the wearer. In addition, an open region 28 is adapted to receive the nose of the wearer, as is understood in the art. Nose region 28 may optionally be provided with a nose piece, either connected to the lens orbitals 18 and 20, or the bridge 22, or directly to the lens(s) depending upon the particular embodiment. Alternatively, the nose piece may be formed by appropriately sculpting the medial edges of the orbitals and lower edge of the bridge, as in the illustrated embodiment.

In accordance with the present invention, at least the orbitals 18 and 20, and optionally the bridge 22, as well as other components of the eyeglass system, are manufactured from a high structural integrity material and preferably through a casting process to optimize structural stability in at least the optical support portion of the final product. The orbitals 18 and 20 can be separately formed and assembled later with a separately manufactured bridge 22, or the orbitals 18, 20 and bridge 22 can be integrally molded or cast as will be appreciated by one of skill in the art in view of the disclosure herein. Casting as disclosed herein desirably eliminates the need to bend metal parts as is done in the prior art methods of making and adjusting metal eyeglass frames.

Earstems 24 and 26 may also be formed through the casting techniques disclosed herein; however, it has been determined by the present inventor that the earstems 24 and 26 are preferably constructed in a manner that permits at least medial and lateral direction flexibility, to enhance the comfort for the wearer and accommodate a variety of head widths. Flexibility of the rearwardly extending ends of earstems 24 and 26 in the desired directions can be accomplished either through the use of flexible construction materials for the earstem as is known in the art, or through the use of relatively rigid earstems in combination with a spring, resilient hinge materials, or other techniques which can be devised to impart a medial bias. Preferably, earstems 24 and 26 are connected directly or indirectly to the orbitals 18 and 20 through the use of hinges. However, non-hinged flexible or inflexible connections may also be used as desired.

Figure 2:
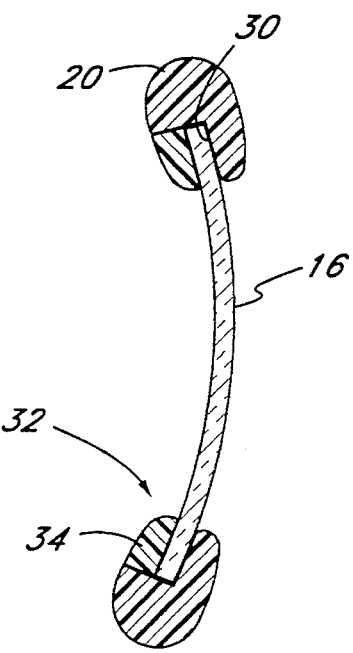
FIG. 2 is a cross-sectional view along the lines 2—2 in FIG. 1.

Referring to FIG. 2, there is disclosed a cross-section through the orbital 20 of the embodiment illustrated in FIG. 1. In this embodiment, the orbital 20 is provided with an annular seat 30 for receiving the lens 16. The annular seat 30 in one embodiment is formed by the sidewall of a channel extending radially outwardly into the orbital 20 for surrounding the edge and a portion of the front and rear surface of the lens 16. In an embodiment having a radially outwardly extending channel for receiving the lens, access to the channel for installing the lens can be provided by bifurcating each orbital along a horizontal, vertical or other axis. The orbital sections can be recombined following insertion of the lens. Alternatively, the seat 30, as illustrated, is formed by the surface of an annular shelf for receiving the lens from the front or rear side of the glasses.

The lens may be retained in the frame in any of a variety of manners. For example, in the illustrated embodiment, a lens retention structure 32 such as a lens retention ring 34 is provided for retaining the lens 16 in the seat 30. The lens retention ring 34 can be secured in position in any of a variety of ways, such as welding, brazing, soldering, adhesives, other metallic bonding techniques, snap fit, threaded engagement, screws, or otherwise as will be understood to those of skill in the art.

As an alternate to a lens retention ring 34, the lens retention structure 32 can be one or more projections extending from the orbital 20 in the direction of the optical zone of the lens, projections on the lens for engaging the orbital, or any of a variety of other structures which will be readily apparent to one of skill in the art in view of the disclosure herein. In one embodiment the lens retention structure 32 is permanently installed at the point of manufacture. Alternatively, the lens retention structure is provided with a snap interfit or other releasable retention feature to permit removal by the wearer such as to permit the wearer to exchange lenses.

The lens can seat directly against the metal seat 30 and lens retention structure 32. Alternatively, a spacer such as a resilient gasket or substantially nonresilient pad can be positioned in between the lens and the seat 30 and/or retention structure 32, to provide a "floating" lens suspension system.

Preferably the frame and optionally the earstems are manufactured through an investment casting technique. One benefit of investment casting is that a high degree of control can be achieved over the design, both structurally and aesthetically.

Figure 3:
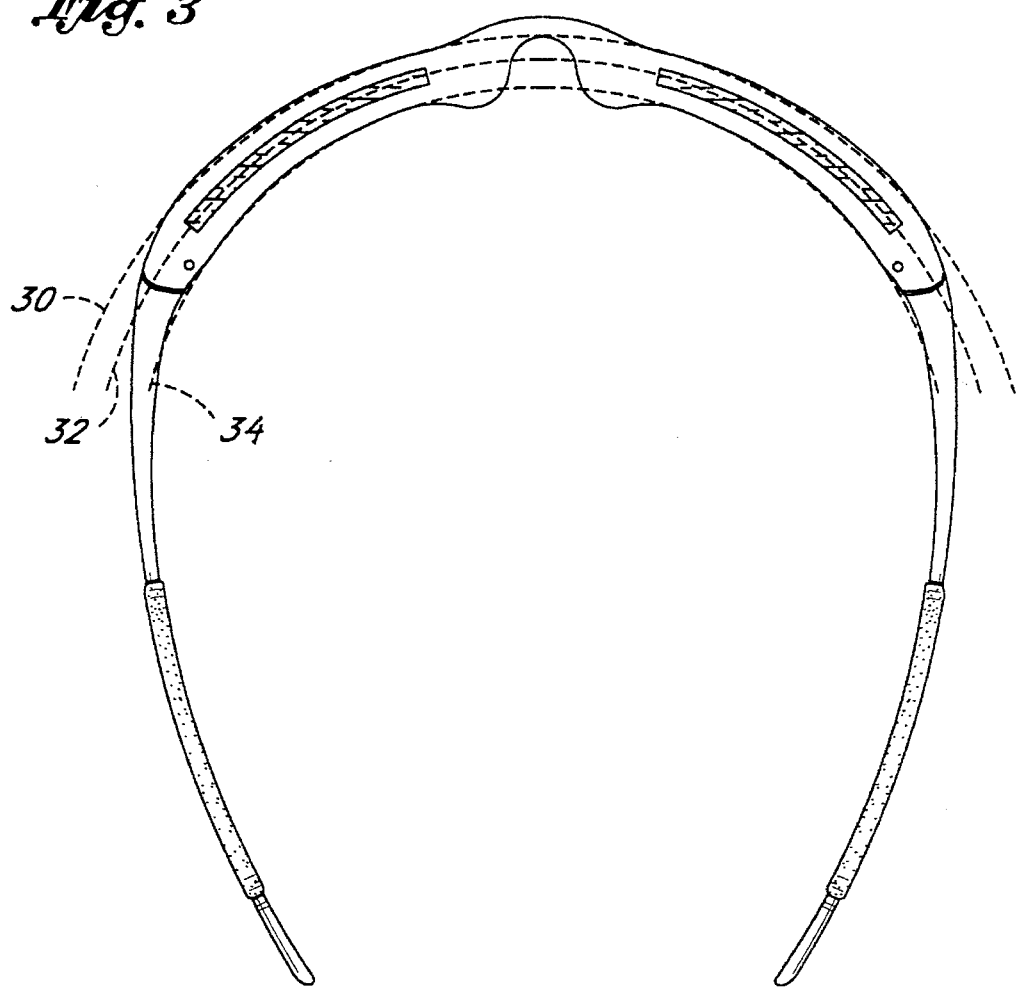
FIG. 3 is a cross-sectional view along the lines 3—3 in FIG. 1.

In one embodiment of the present invention, the surfaces of the lenses or optical zones lie on the surface of a solid geometric shape having a curve of substantially constant radius along what is the horizontal meridian of the eyeglasses. Thus, for example, referring to FIG. 3, the front surface of one embodiment of the eyeglass frame conforms generally to a curve 40 such as a base 4 curve. The lens slot preferably conforms generally to a curve 42 such as a base 6, and the concave surface of the eyeglasses conforms generally to a curve 44 of base 8.

In a typical dual lens investment cast dimensionally stable eyeglass in accordance with the present invention, the overall arc length of the eyeglasses roughly from hinge to hinge is within the range of from about 5½ inches to about 8.0 inches. The maximum vertical height of the glasses through each of the right and left optical zones is typically within the range of from about ¾ inch to about 2½ inches. The arc length of each right and left lens in a dual lens system is typically within the range of from about 1½ inches to about 3 inches. The narrowest vertical dimension of the eyeglass at the bridge is generally between about ¼ inch and about ¾ inch depending upon materials and design variables.

Referring to the fragmentary cross section shown in FIG. 4, in a cast titanium embodiment, the cross sectional dimensions through a portion of the orbital are as follows. The widest top to bottom dimension d1 is from about ¹⁄₁₆ inch to about ¾ inch. The widest front to back dimension d2 is from about ⅛ inch to about ½ inch. The front to back dimension d3 at seat 30 is from about 1/32 inch to about 1/8 inch. The top to bottom dimension d4 at seat 30 is from about 1/32 inch to about 1/2 inch.

Figure 4:
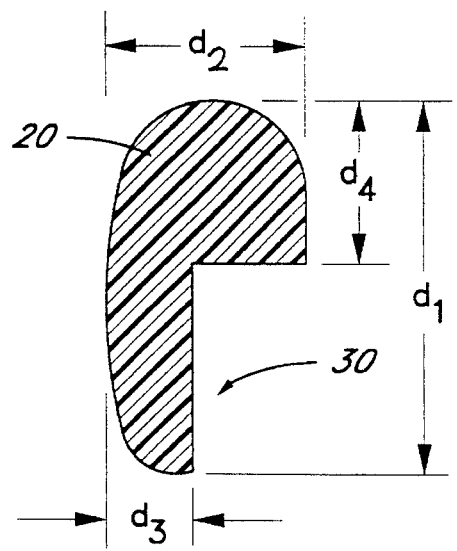
FIG. 4 is a cross-sectional view through the top frame portion of an orbital of the eyeglasses illustrated in FIG. 1.
Figure 5:
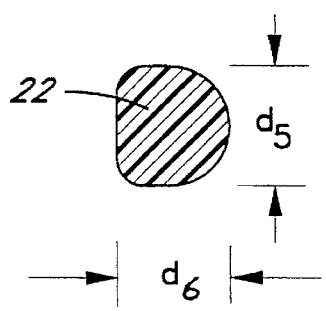
FIG. 5 is a cross-sectional view through the bridge portion of the eyeglasses illustrated in FIG. 1.

In general, no portion of the orbital will have a cross sectional area that is less than the area achieved by the low end of the dimensions recited above. The bridge 22 generally has an even larger cross sectional area than the top or bottom sections of the orbital. Thus, referring to FIG. 5, in one embodiment of the invention, the bridge 22 has a height d5 of about 1/2 inch and a depth d6 of about 1/4 inch. The cross sectional area at the narrowest portion of the bridge is generally no less than approximately 0.1 square inches.

Where the cross section through a segment of the orbital is non-circular, as in FIG. 4, the length to diameter ratio can be standardized for comparison by calculating the cross sectional area and then converting that area to a circular configuration. The diameter of the circle having the same area as the orbital segment is then used in determining the length to diameter radio.

Casting in accordance with the present invention permits relatively larger cross sectional areas (smaller length to diameter (l:d) ratios) than the prior art wire frame glasses, thereby enhancing stability. l:d ratios may be conveniently reported as an average over a desirable length. This may be useful, for example, where the diameter or cross sectional area changes significantly along the circumferential arc of the orbital.

For example, l:d ratios may conveniently be determined using a diameter based upon a 1/2 inch running average, one inch average or even 1/4 inch average or smaller, indicating that the diameter used in the l:d ratio is the average diameter along the specified length. The l:d ratio can then be expressed using any hypothetical standard length, such as one inch to conveniently compare l:d ratios from one product to another.

Alternatively, cast eyewear frames in accordance with the present invention can be characterized by the minimum cross sectional dimension. This may be convenient, for example, where irregular cross sectional configurations are involved. For example, the orbital cross section may have a generally "c" or "u" configuration, due to the groove for receiving the lens. The minimal cross sectional configuration may be through either of the legs of the u configuration, or through the bottom of the u configuration. In general, the smallest cross sectional dimensions through the orbital will be no less than about 0.040 inches average over a distance of no less than about 1/2 inch. Preferably, the minimum 1/2 inch running average will be no less than about 0.60 inches, and, in some embodiments, the minimum cross sectional dimension will be as much as 0.075 inches over a 1/2 inch length or greater. Portions of the eyeglass orbital will often be greatly in excess of the foregoing minimum dimensions, particularly in the region of the lateral and medial portions of the orbital. By expressing the minimum cross sectional dimension as an average minimum over a 1/2 inch length, it is contemplated that the cross sectional dimension at any specific point could neck down to a smaller cross sectional dimension than stated, although only for a relatively short distance along the orbital, so that the average cross sectional dimension over a 1/2 inch length will still meet the recited minimums.

Relatively smaller cross sectional dimensions through portions of the eyeglass frame can be utilized with relatively higher rigidity construction materials as will be appreciated in view of the disclosure herein, or with glass lenses. In polymeric lens systems, greater reliance will be placed upon the frame for imparting structural stability. That generally means thicker orbital segments will be desirable.

In a dual lens system, the stability of one lens with respect to the other is strongly influenced by the design and material of the bridge portion 22. In an embodiment that is investment cast from a high titanium content material, the cross section through the thinnest portion of the bridge will generally be no less than about 1/32 inch.

Frames such as those disclosed in U.S. Pat. No. 4,611,371 to Fujino et al., which purports to disclose cast metal eyeglass parts, would if they could even be made as described, likely exhibit undesirably high flexibility. Those frames appear to use wire having about a 10:1 length to diameter ratio, and a cross sectional area on the order of about 4 mm$^2$. In general, in an embodiment of the type illustrated in FIG. 1, the portions of the orbitals above and below the lenses will have a length to diameter ratio over any one inch length of no higher than about 5:1.

Any of a variety of materials can be utilized to produce a dimensionally stable eyewear system. However, producing an eyeglass having sufficient dimensional stability using certain materials and techniques introduces excessive weight in the finished product, excessive manufacturing costs, or other undesirable circumstance. Thus, the selection of a particular technique or material can be optimized in accordance with the requirements of the product and manufacturer, in view of the disclosure herein.

For example, a variety of steel alloys, such as chrome molybdenum, chromium nickel molybdenum, nickel molybdenum and chrome vanadium steel alloys can be formulated to exhibit good structural properties. Copper, aluminum and silver based alloys can also be used. Preferably, however, lightweight, high strength materials such as titanium a titanium-based alloy or titanium based metal matrix composite such as TI6AL4V, available from Timet Corp., are utilized in constructing the eyeglass orbitals of the present invention.

The preferred alloy or metal exhibits relatively high strength and stiffness and relatively low weight. Certain copper, aluminum and silver alloys, depending upon temper treatment, have mechanical properties of ultimate strength, initial yield point and modulus of elasticity similar to titanium but differ more significantly in the strength to weight ratio.

In general, any investment castable metal or metal containing material is a candidate for use in connection with the present invention. Optimizing a particular metal or metal containing material can be done through routine experimentation by one of ordinary skill in the art in view of the disclosure contained herein. In addition to metal choice and dimensional choice, physical properties of the finished cast eyewear can be modified by post investment casting procedures, such as tempering, compaction, or others known in the art.

Depending upon the construction material and the required physical characteristics of the finished product, any of a variety of construction techniques can be utilized to produce dimensionally stable eyewear. For example, modifications of machining techniques, casting and forging methods can be used. With respect to casting techniques, metal framed eyewear can be produced utilizing sand castings, permanent mold castings, dye castings or investment casting techniques.

One preferred method for manufacturing the dimensionally stable eyewear or eyewear components in accordance with the present invention is investment casting. Investment casting of dimensionally stable metal eyewear components can be accomplished utilizing a ceramic mold. The mold is formed by pouring a slurry of a material such as a known mold forming refractory material around an orbital or eyeglass pattern, which is maintained in position within a flask as is understood in the investment casting art.

Following a preliminary drying, the mold is baked in an oven to melt the pattern, thereby leaving an empty mold cavity. The investment mold is thereafter fired at a temperature which is appropriate for the metal to be used, and, while still hot, molten metal is poured into the mold and allowed to solidify. The mold is thereafter broken away from the casting to produce the cast orbital or eyeglass. The cast component may thereafter be subject to post-casting operations such as sanding, polishing, grinding, or otherwise as desired to produce the finished product.

The present inventor has determined that through the design flexibility available with investment cast metal parts, eyeglass frames can be constructed which maintain a relatively high dimensional stability, yet with the minimal amount of material necessary to achieve that stability. This is due to the opportunity to make complex curves, hollows and other surface contours which allow excess non-structural material to be eliminated. In addition, the eyeglass can be designed in a manner that simultaneously optimizes the aerodynamic properties of the finished eyeglass, and allows considerable aesthetic design flexibility. Sharp angles and other stress points can be minimized or eliminated, and an overall aesthetic appearance can be maintained.

In addition to the conventional metals and metal alloys discussed above, the objectives of the present invention can be achieved through the use of metal matrix composites, metal-polymer blends and potentially purely polymeric compositions which exhibit sufficient structural integrity to accomplish the desired stabilizing results.

Although the foregoing invention has been described in terms of certain preferred embodiments, other embodiments will become apparent to those of ordinary skill in the art in view of the disclosure herein. Accordingly, the present invention is not intended to be limited by the recitation of preferred embodiments, but is intended to be defined solely by reference to the appended claims.

What is claimed:

1. Dimensionally stable eyeglasses, comprising:

first and second lenses, having first and second optical zones, respectively; and a frame connected to the lenses and formed from an investment cast metal to substantially limit movement of the first optical zone with respect to the second optical zone, wherein the minimum cross sectional dimension of the frame, expressed as an average along any one half inch section of the frame, is no less than about 0.040 inches.

2. Dimensionally stable eyeglasses as in claim 1, wherein said frame surrounds each of said lenses.

3. Dimensionally stable eyeglasses as in claim 2, wherein said frame comprises first and second annular seats for receiving said first and second lenses.

4. Dimensionally stable eyeglasses as in claim 3, further comprising a retainer for retaining each of said first and second lenses.

5. Dimensionally stable eyeglasses as in claim 1, wherein said frame comprises a substantially smooth exterior surface.

6. Dimensionally stable eyeglasses as in claim 1, wherein said metal comprises titanium.

7. Dimensionally stable eyeglasses as in claim 1, further comprising first and second earstems connected to said eyeglasses.

* * * * *